United States Patent
Xu et al.

(10) Patent No.: US 10,664,680 B2
(45) Date of Patent: May 26, 2020

(54) OPTICAL FINGERPRINT RECOGNITION APPARATUS AND DISPLAY PANEL

(71) Applicant: BOE TECHNOLOGY GROUP CO., LTD., Beijing (CN)

(72) Inventors: Rui Xu, Beijing (CN); Xue Dong, Beijing (CN); Haisheng Wang, Beijing (CN); Chun-Wei Wu, Beijing (CN); Yingming Liu, Beijing (CN); Changfeng Li, Beijing (CN); Yunke Qin, Beijing (CN); Xiaoliang Ding, Beijing (CN); Pinchao Gu, Beijing (CN); Lijun Zhao, Beijing (CN); Yanan Jia, Beijing (CN); Yuzhen Guo, Beijing (CN); Jing Lv, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 15/759,755

(22) PCT Filed: Sep. 18, 2017

(86) PCT No.: PCT/CN2017/102045
§ 371 (c)(1),
(2) Date: Mar. 13, 2018

(87) PCT Pub. No.: WO2018/153070
PCT Pub. Date: Aug. 30, 2018

(65) Prior Publication Data
US 2019/0050621 A1 Feb. 14, 2019

(30) Foreign Application Priority Data
Feb. 23, 2017 (CN) .......................... 2017 1 0101011

(51) Int. Cl.
*G06K 9/00* (2006.01)
*G02B 27/30* (2006.01)

(52) U.S. Cl.
CPC .......... *G06K 9/0004* (2013.01); *G02B 27/30* (2013.01); *G06K 2009/0006* (2013.01)

(58) Field of Classification Search
None
See application file for complete search history.

(56) References Cited

U.S. PATENT DOCUMENTS

| 5,510,915 A | * | 4/1996 | Ge | G02F 1/1362 349/149 |
| 7,706,073 B2 | * | 4/2010 | Munro | B29D 11/00278 359/626 |

(Continued)

FOREIGN PATENT DOCUMENTS

| CN | 101419662 A | 4/2009 |
| CN | 102081483 A | 6/2011 |

(Continued)

OTHER PUBLICATIONS

First Office Action for CN Appl. No. 201710101011.2, dated Mar. 28, 2019.

(Continued)

*Primary Examiner* — Michelle M Entezari
(74) *Attorney, Agent, or Firm* — Foley & Lardner LLP

(57) ABSTRACT

The embodiments of the present disclosure provide an optical fingerprint recognition apparatus and a display panel. The apparatus comprises: a light emitting structure (1), a collimating structure (2) and a plurality of photosensitive sensors (3); the light emitting structure (1) is used for generating detecting light; the collimating structure (2) is used for filtering the detecting light reflected by a finger, such that light with a scattering angle in a predetermined range transmits through the collimating structure (2); the (Continued)

photosensitive sensors (3) are used for receiving the light transmitted through the collimating structure (2) and acquiring fingerprint information according to the received light. The embodiments of the present disclosure are used for manufacturing a display panel. The present disclosure can enhance accuracy of the recognized fingerprint information during an optical fingerprint recognition process.

16 Claims, 10 Drawing Sheets

(56) References Cited

U.S. PATENT DOCUMENTS

| | | | | |
|---|---|---|---|---|
| 9,904,160 | B2* | 2/2018 | Hu | G03B 21/2013 |
| 10,002,281 | B2* | 6/2018 | Wu | G06K 9/0004 |
| 10,146,258 | B2* | 12/2018 | Sinha | G06F 1/1643 |
| 10,410,036 | B2* | 9/2019 | He | G06F 3/044 |
| 10,437,974 | B2* | 10/2019 | He | G06K 9/00046 |
| 10,509,940 | B2* | 12/2019 | Yeke Yazdandoost | G06K 9/2036 |
| 2003/0197278 | A1* | 10/2003 | Joshi | H01L 23/492 257/772 |
| 2009/0322378 | A1* | 12/2009 | Halahmi | H03K 17/545 326/130 |
| 2015/0036080 | A1* | 2/2015 | Yan | G02F 1/133524 349/96 |
| 2016/0224816 | A1* | 8/2016 | Smith | G02B 27/58 |
| 2016/0254312 | A1* | 9/2016 | Lee | G06K 9/0004 382/125 |
| 2016/0268096 | A1* | 9/2016 | Ren | H01J 37/28 |
| 2017/0019543 | A1* | 1/2017 | Cho | H04N 1/00129 |
| 2017/0255094 | A1* | 9/2017 | Korenev | G03B 21/60 |
| 2018/0046837 | A1* | 2/2018 | Gozzini | G06K 9/0004 |
| 2018/0211078 | A1* | 7/2018 | Lillie | G06K 9/0002 |
| 2018/0233702 | A1* | 8/2018 | Chen | G02F 1/133305 |

FOREIGN PATENT DOCUMENTS

| | | |
|---|---|---|
| CN | 102955936 A | 3/2013 |
| CN | 103729093 A | 4/2014 |
| CN | 105172234 A | 12/2015 |
| CN | 105550664 A | 5/2016 |
| CN | 105844212 A | 8/2016 |
| CN | 106886767 A | 6/2017 |

OTHER PUBLICATIONS

International Search Report and Written Opinion for International Appl. No. PCT/CN2017/102045, dated Dec. 5, 2017.

* cited by examiner

OPTICAL FINGERPRINT RECOGNITION APPARATUS AND DISPLAY PANEL

CROSS-REFERENCE TO RELATED APPLICATIONS

This application is a U.S. National Stage under 35 U.S.C. § 371 of PCT/CN2017/102045, filed on Sep. 18, 2017, which claims priority to and the benefit of Chinese Patent Application No. 201710101011.2, filed on Feb. 23, 2017, the disclosure of which is incorporated herein in its entirety by reference.

TECHNICAL FIELD

The present disclosure relates to an optical fingerprint recognition apparatus and a display panel.

BACKGROUND

Fingerprints refer to raised and sagged lines on front face skin at the tip end of a human finger, wherein a raised position is called a ridge, and a sagged position is called a valley. Due to its permanency, uniqueness and convenience, the fingerprint has nearly become a synonymous of biometrics.

At present, a fingerprint recognition apparatus integrated in a display module is generally provided in a non-display area such as on a main menu key or at a back surface of the display module. The display module is in development to ultrathin, high color gamut, wide view and integration. Hence, it is a hot point of study to integrate a fingerprint recognition apparatus to a display area of a display module for optical fingerprint recognition.

SUMMARY

However, during an optical fingerprint recognition process, when a distance between the finger and the sensor is great, due to scattering of light reflected by the finger, the sensor may simultaneously receive light reflected by a plurality of ridges and/or valleys, such that the fingerprint information recognized according to the light received by the sensor is inaccurate. Thus, it is an urgent technical problem to be solved by those skilled in the art on how to enhance accuracy of fingerprint information recognized during the optical fingerprint recognition process.

The embodiments of the present disclosure provide an optical fingerprint recognition apparatus and a display panel, which are used for enhancing accuracy of fingerprint information recognized during the optical fingerprint recognition process.

In a first aspect, an optical fingerprint recognition apparatus is provided, which comprises: a light emitting structure, a collimating structure and a plurality of photosensitive sensors; wherein:

the light emitting structure is used for generating detecting light;

the collimating structure is used for filtering the detecting light reflected by a finger, such that light with a scattering angle in a predetermined range transmits through the collimating structure;

the photosensitive sensors are used for receiving the light transmitted through the collimating structure and acquiring fingerprint information according to the received light.

Optionally, the light emitting structure comprises: a driving back plate, an insulation layer arranged on the driving back plate, an anode electrode layer and an isolation layer arranged on the insulation layer, an organic light emitting layer arranged on the anode electrode layer, a cathode electrode arranged on the organic light emitting layer and the isolation layer, an encapsulation layer arranged on the cathode electrode and a cover layer covering the encapsulation layer.

Optionally, the photosensitive sensor comprises a sensing electrode, a diode and a triode;

the sensing electrode is connected to the anode of the diode and is used for receiving the light transmitted through the collimating structure and converting the light transmitted through the collimating structure into current;

the cathode electrode of the diode is connected to a first electrode of the triode; a second electrode of the triode is connected to a current detecting end, and a gate of the triode is connected to a control signal end.

Optionally, the isolation layer and/or the insulation layer are made of a light-shielding material; or the isolation layer and/or the insulation layer are made of a translucent material;

the collimating structure comprises a plurality of through-holes penetrating the isolation layer and the insulation layer.

Optionally, the collimating structure comprises a collimating layer arranged on the back of the driving back plate; the collimating layer is made of a light-shielding material or a translucent material; and the collimating layer has a plurality of through-holes arranged thereon.

Optionally, the aperture of each of the through-holes is greater than or equal to 0.1 micron and smaller than or equal to 10 microns.

Optionally, a ratio between the aperture of each of the through-holes and the depth of each of the through-holes is greater than or equal to 1:50 and smaller than or equal to 1:5.

Optionally, the collimating structure comprises a first collimator and a second collimator;

the first collimator comprises a plurality of first through-holes arranged on a source drain metal layer of the driving back plate;

the second collimator comprises: a substrate arranged on the back of the driving back plate, a light-shielding material layer arranged on a face of the substrate opposite to the driving back plate, and a plurality of second through-holes penetrating the substrate and the light-shielding material layer; wherein the openings of the first through-holes and the openings of the second through-holes are in alignment with each other.

Optionally, the first through-holes and the second through-holes are round through-holes, or the first through-holes and the second through-holes are square through-holes.

Optionally, the aperture of each of the second through-holes is greater than or equal to 0.1 micron and smaller than or equal to 2 microns.

Optionally, the collimating structure comprises: a substrate arranged on the back of the driving back plate, a first light-shielding material layer arranged on the upper surface of the substrate, a second light-shielding material layer arranged on the lower surface of the substrate, and a through-hole penetrating the first light-shielding material layer, the substrate and the second light-shielding material layer.

Optionally, a light-absorbing material layer is arranged on the wall of the through-hole.

Optionally, the collimating structure comprises: a first privacy film arranged on the back of the driving back plate and a plurality of first privacy prisms arranged between the first privacy film and the driving back plate.

Optionally, the collimating structure further comprises: a second privacy film arranged on the cover layer and a plurality of second privacy prisms arranged on the second privacy film;

the gaps among the plurality of first privacy prisms and the gaps among the plurality of second privacy prisms are in alignment with each other.

Optionally, the collimating structure comprises: a plurality of focusing lenses arranged between the cover layer and the encapsulation layer, a first collimator and a second collimator;

the first collimator comprises a plurality of through-holes arranged on a source drain metal layer of the driving back plate; the plurality of through-holes are respectively located on a primary optical axis of one of the focusing lenses;

the second collimator comprises a light-shielding material arranged on the back of the driving back plate; the light-shielding material is provided with a plurality of openings; the plurality of openings are respectively located on a primary optical axis of one of the focusing lenses.

Optionally, each of the focusing lens has a radius greater than or equal to 6 microns.

Optionally, each of the openings has a diameter of 4 microns.

In a second aspect, a display panel is provided, comprising an optical fingerprint recognition apparatus according to any one of the first aspect.

The optical fingerprint recognition apparatus provided by the embodiments of the present disclosure comprises: a light emitting structure, a collimating structure and a plurality of photosensitive sensors; wherein: the light emitting structure is used for generating detecting light; the collimating structure is used for filtering the detecting light reflected by a finger, such that light with a scattering angle in a predetermined range transmits through the collimating structure; the photosensitive sensors are used for receiving the light transmitted through the collimating structure and acquiring fingerprint information according to the received light. Since the collimating structure in the embodiments of the present disclosure can filter the detecting light reflected by a finger, such that light with a scattering angle in a predetermined range transmits through the collimating structure, any one of the photosensitive sensors can only receive light reflected by a position on the finger corresponding to it, such that light reflected by other positions on the finger would not impose an influence on the fingerprint information acquired by it according to the received light. Thus, the embodiments of the present disclosure can enhance accuracy of fingerprint information recognized during the optical fingerprint recognition process.

BRIEF DESCRIPTION OF THE DRAWINGS

In order to more clearly illustrate the technical solutions in the examples of the present disclosure or in the prior art, the drawings used for the description of the examples or the prior art are simply introduced below. Obviously, the drawings described below are just some examples of the present disclosure, and other drawings can be obtained by those skilled in the art based on these drawings without any inventive effort.

DETAILED DESCRIPTION

The technical solutions in the examples of the present disclosure will be described in a clear and complete manner below in combination with the drawings in the examples of the present disclosure. Obviously, the described examples are just a part instead of all of the examples of the present disclosure. Examples obtained by those skilled in the art based on the examples in the present disclosure without any inventive effort all fall into the scope of protection of the present disclosure.

In the examples of the present disclosure, the term "and/or" only describes association relations between the objects, meaning that there may be three kinds of relations therebetween; for example, A and/or B may represent the following three kinds of relations: A exists alone, A and B exist simultaneously, and B exists alone. In addition, the symbol "/" as used herein generally represents an "or" relation between the objects before and after said symbol. Without interpretation, the term "a plurality of" as used herein refers to two or more than two.

It is to be noted that in order to clearly describe the technical solutions of the examples of the present disclosure, in the examples of the present disclosure, wordings like "first", "second" and the like are used to distinguish identical or similar items having basically the same functions and effects, and it is understandable to those skilled in the art that the wordings like "first" and "second" do not limit the number and sequence of performance.

It is to be further noted that in the examples of the present disclosure, a wording such as "illustrative" or "for example" represents an example, exemplification or illustration. None of the examples or design solutions described as "illustrative" or "as an example" in the examples of the present disclosure shall be interpreted as more preferable or more advantageous than other examples or design solutions. More specifically, the use of a wording such as "illustrative" or "for example" aims at presenting a certain concept in a specific manner. In addition, in the examples of the present disclosure, unless otherwise illustrated, "a plurality of" means two or more than two.

The examples of the present disclosure provide an optical fingerprint recognition apparatus. In particular, as shown in FIG. 1, the optical fingerprint recognition apparatus comprises: a light emitting structure 1, a collimating structure 2, and a plurality of photosensitive sensors 3.

Figure 1:
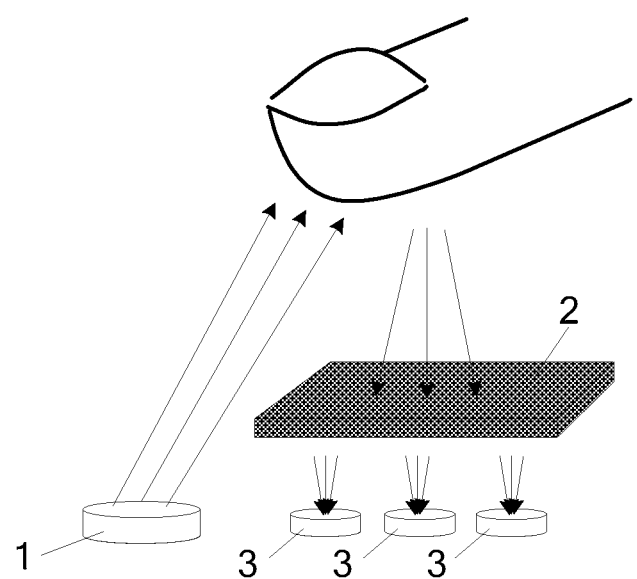
FIG. 1 is a schematic structure diagram showing an optical fingerprint recognition apparatus provided by the examples of the present disclosure.

The light emitting structure 1 is used for generating detecting light (represented by arrowed lines in FIG. 1).

The collimating structure 2 is used for filtering the detecting light reflected by a finger, such that light with a scattering angle in a predetermined range transmits through the collimating structure 2.

The photosensitive sensors 3 (in FIG. 1, as an example, the optical fingerprint recognition apparatus comprises 3 photosensitive sensors 3) are used for receiving the light transmitted through the collimating structure 2 and acquiring fingerprint information according to the received light.

The optical fingerprint recognition apparatus provided by the examples of the present disclosure comprises: a light emitting structure, a collimating structure and a plurality of photosensitive sensors; wherein: the light emitting structure is used for generating detecting light; the collimating structure is used for filtering the detecting light reflected by a finger, such that light with a scattering angle in a predetermined range transmits through the collimating structure; the plurality of photosensitive sensors are used for receiving the light transmitted through the collimating structure and acquiring fingerprint information according to the received light. Since the collimating structure in the examples of the present disclosure can filter the detecting light reflected by a finger, such that light with a scattering angle in a predetermined range transmits through the collimating structure, any photosensitive sensor can only receive light reflected by a position on the finger corresponding to it, such that light reflected by other positions on the finger would not impose an influence on the fingerprint information acquired by it according to the received light. Thus, the examples of the present disclosure can enhance accuracy of fingerprint information recognized during a process of optical fingerprint recognition.

Figure 2:
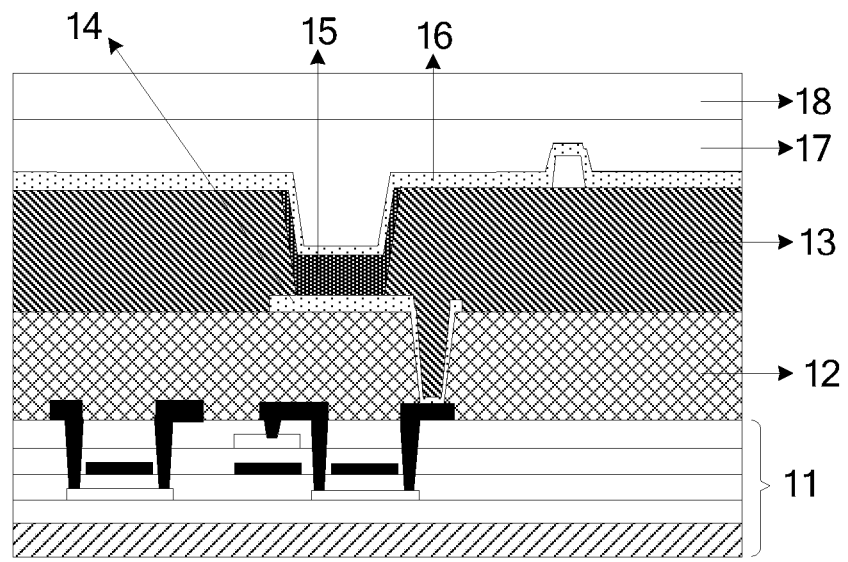
FIG. 2 is a schematic structure diagram showing a light emitting structure provided by the examples of the present disclosure.

Further, the examples of the present disclosure provide an embodiment of the light emitting structure 1. As shown in FIG. 2, the light emitting structure 1 comprises: a driving back plate 11, an insulation layer 12 arranged on the driving back plate 11, an anode electrode 14 and an isolation layer 13 arranged on the insulation layer 12, an organic light emitting layer 15 arranged on the anode electrode layer 14, a cathode electrode 16 arranged on the organic light emitting layer 15 and the isolation layer 13, an encapsulation layer 17 arranged on the cathode electrode 16 and a cover layer 18 covering the encapsulation layer 17.

It is to be noted that the driving back plate 11 may comprise structures including a substrate, a passivation layer, a gate metal layer, an active layer, a source drain metal layer and the like as well as a switching thin film transistor (TFT) and a driving TFT. In the examples of the present disclosure, the driving back plate is not limited to any specific structures, as long as it can drive the light emitting structure 1 to emit light.

It is to be further noted that the light emitting structure 1 may comprise other structures, including, for example, a spacer that may be arranged between the isolation layer 13 and the encapsulation layer 17, and an optical adhesive arranged between the encapsulation layer 17 and the cover layer 18. However, these are reasonably variable solutions for the examples of the present disclosure, so they fall into the scope of protection of the examples of the present disclosure.

The light emitting structure 1 in the above example is a basic structure of an organic light-emitting diode (OLED) display, so the optical fingerprint recognition apparatus provided by said example may be applied to an OLED for implementing optical fingerprint recognition in the display area of the OLED.

Figure 3:
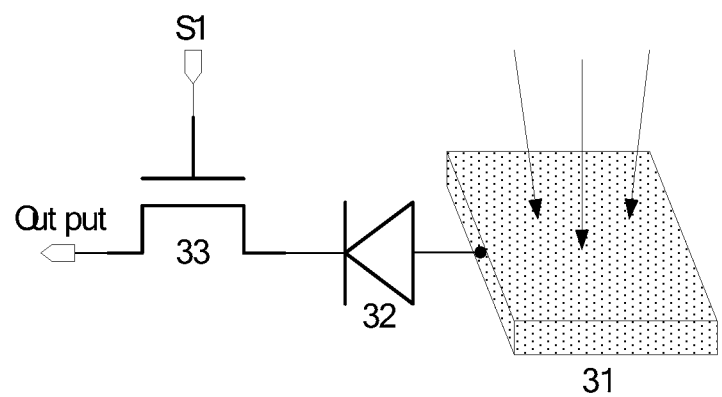
FIG. 3 is a schematic structure diagram showing a photosensitive sensor provided by the examples of the present disclosure.

Further, the examples of the present disclosure further provide a specific structure of the photosensitive sensor 3. As shown in FIG. 3, the photosensitive sensor 3 comprises: a sensing electrode 31, a diode 32 and a triode 33.

The sensing electrode 31 is connected to the anode of the diode 32 and used for receiving the light transmitted through the collimating structure 2 and converting the light transmitted through the collimating structure 2 into current.

The cathode electrode of the diode 32 is connected to a first electrode of the triode 33; a second electrode of the triode 33 is connected to a current detecting end (Output), and a gate of the triode 33 is connected to a control signal end (S1).

The working principle of the photosensitive sensor 3 is described below.

When the sensing electrode 31 does not receive light, a dark current exists between the triode 33 and the diode 32, and at this time, the current value of the second electrode of the triode 33/the current detecting end (Output) is detected and recorded. When the sensing electrode 31 receives light, the gate of the triode 33 inputs an ON signal (when the triode is an N-type TFT, a high level is inputted as the ON signal, and when the triode is a P-type TFT, a low level is inputted as the ON signal), the sensing electrode 31 receives the light and generates an optical current, the diode 32 performs reverse biasing, and again the current value of the second electrode of the triode 33/the current detecting end (Output) is detected and recorded. Based on a ratio between the two detected currents, it can be recognized whether the light received by the photosensitive electrode 31 is reflected by a valley or a ridge of the fingerprint, and thus finally recognizing the fingerprint.

Further, when the optical fingerprint recognition apparatus provided by the above example is applied to an OLED as shown in FIG. 2, the present disclosure particularly provides the following several embodiments for the collimating structure 2.

Embodiment I

Figure 4:
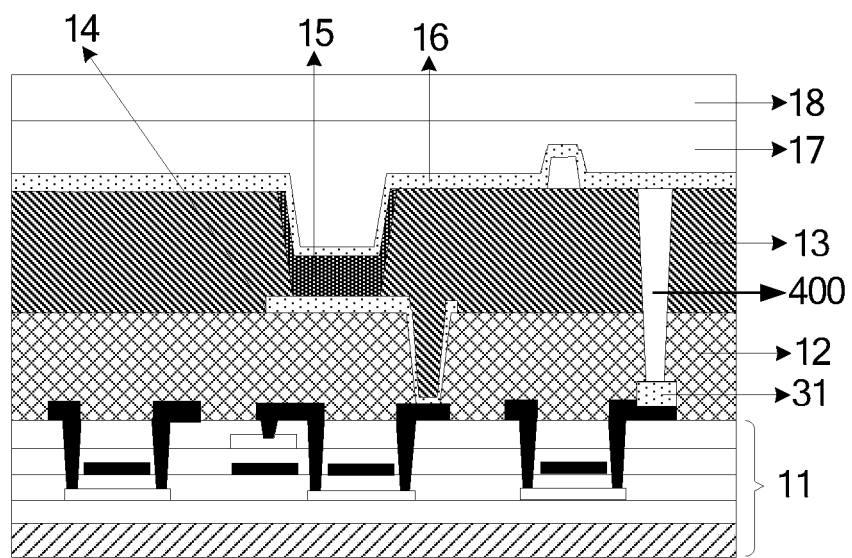
FIG. 4 is a first schematic structure diagram showing a collimating structure provided by the examples of the present disclosure.

As shown in FIG. 4, the isolation layer 12 and/or the insulation layer 13 are made of a light-shielding material; or the isolation layer 12 and/or the insulation layer 13 are made of a translucent material.

That is, said example includes the following solutions: 1. the isolation layer 12 is made of a light-shielding material; 2. the insulation layer 13 is made of a light-shielding material; 3. the isolation layer 12 and the insulation layer 13 are made of light-shielding materials; 4. the isolation layer 12 is made of a translucent material; 5. the insulation layer 13 is made of a translucent material; 6. the isolation layer 12 and the insulation layer 13 are made of translucent materials. In addition, said example may include a solution formed by a combination of any of the above solutions. For example, the isolation layer 12 is made of a light-shielding material, and the insulation layer 13 is made of a translucent material. That is, it is only necessary that the isolation layer 12 and the insulation layer 13 can shield the detecting light reflected by the finger.

The collimating structure 2 comprises: a plurality of through-holes 400 penetrating the isolation layer 12 and the insulation layer 13.

Illustratively, the plurality of through-holes 400 penetrating the isolation layer 12 and the insulation layer 13 may be formed during the manufacturing of the OLED. For example, the through-holes 400 may be formed on the insulation layer 13 by a via process after the insulation layer 13 is manufactured.

Illustratively, as shown in FIG. 4, the photosensitive sensors 3 may be integrated in the driving back plate of the OLED, wherein the sensing electrode 31 of the photosensitive sensor 3 may be provided at the opening of a through-hole 400.

Further, the working principle of the collimating structure 2 as shown in FIG. 4 is described below.

Figure 5:
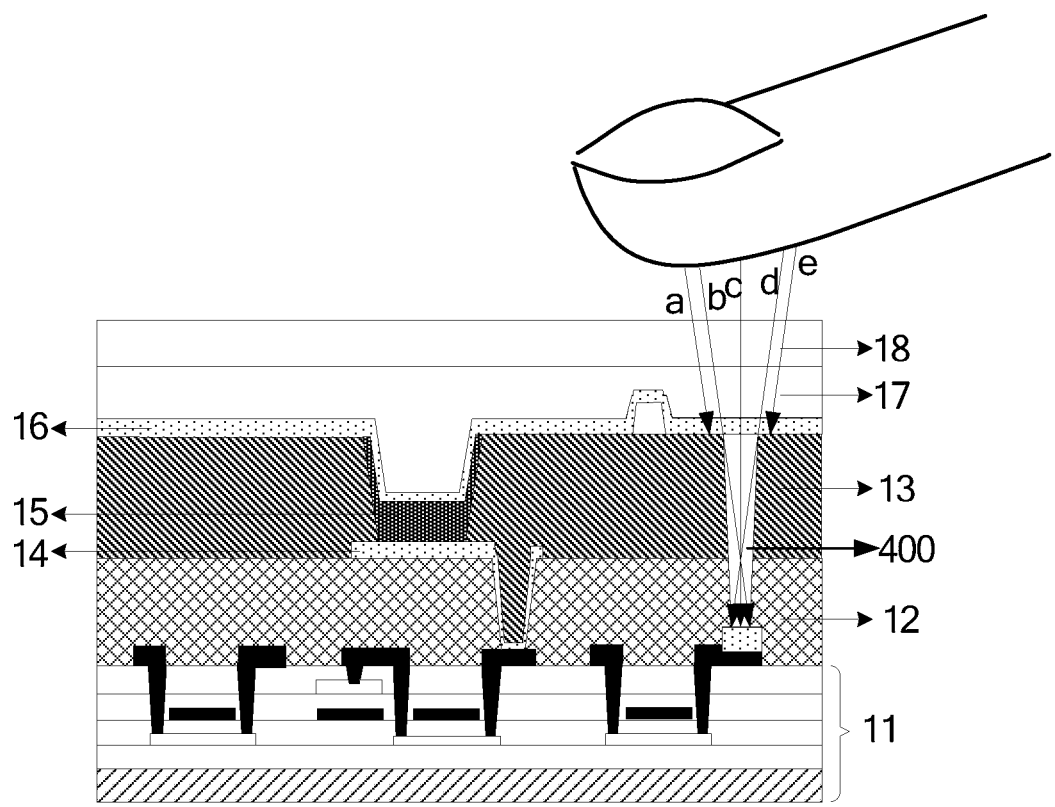
FIG. 5 is a diagram showing the working principle of the collimating structure as shown in FIG. 4 provided by the examples of the present disclosure.

As shown in FIG. 5, the detecting lights emitted from the organic light emitting layer 15 of the OLED transmit in sequence through the cathode electrode 16, the encapsulation layer 17 and the cover layer 18 to reach the finger, and the finger reflects the detecting lights; when the insulation layer 13 is made of a transparent material and the isolation layer 12 is made of a light-shielding material or a translucent material, light "a" and light "e" may transmit through the insulation layer 13 to reach the isolation layer 12 and blocked by the isolation layer 12; when the insulation layer 13 is made of a light-shielding material or a translucent material, light "a" and light "e" are blocked directly by the insulation layer 13; thus, light "a" and light "e" cannot reach the photosensitive electrode 31; light "b", light "c" and light "d" can transmit through the through-hole 400 to the photosensitive electrode 31; hence, the detecting light received by the photosensitive electrode 31 includes lights reflected by an area between light "b" and light "d" and having a scattering angle between light "b" and light "d". Since the lights that can be received by the photosensitive electrode 31 are defined within said range, it can be ensured that the photosensitive electrode 31 only receives one piece of line information, and thus solving the problem of confusing lines. The plurality of through-holes 400 cause the photosensitive electrode 31 of each photosensitive sensor to receive only one piece of line information, and finally, fingerprint information of the finger is obtained by the plurality of photosensitive sensors 3.

It is to be further noted that the aperture of each of said through-holes 400 shall be sufficiently small and a ratio between the aperture and the depth of each of the through-holes 400 shall be sufficiently great so as to prevent lights reflected by other lines from irradiating the photosensitive electrode 31. Thus, preferably, the aperture of each of the through-holes 400 is greater than or equal to 0.1 micron and smaller than or equal to 10 microns; a ratio between the aperture and the depth of each of the through-holes 400 is greater than or equal to 1:50 and smaller than or equal to 1:5. More preferably, the aperture of each of the through-hole 400 is greater than or equal to 0.1 micron and smaller than or equal to 2 microns; a ratio between the aperture and the depth of each of the through-holes 400 is greater than or equal to 1:10 and smaller than or equal to 1:5. In addition, the specific value of the aperture of each of the through-holes 400 can be determined according to a number of sensing electrodes 31 within a unit area. The specific value of the aperture of each of the through-holes 400 is not limited in the examples of the present disclosure.

Embodiment II

Figure 6:
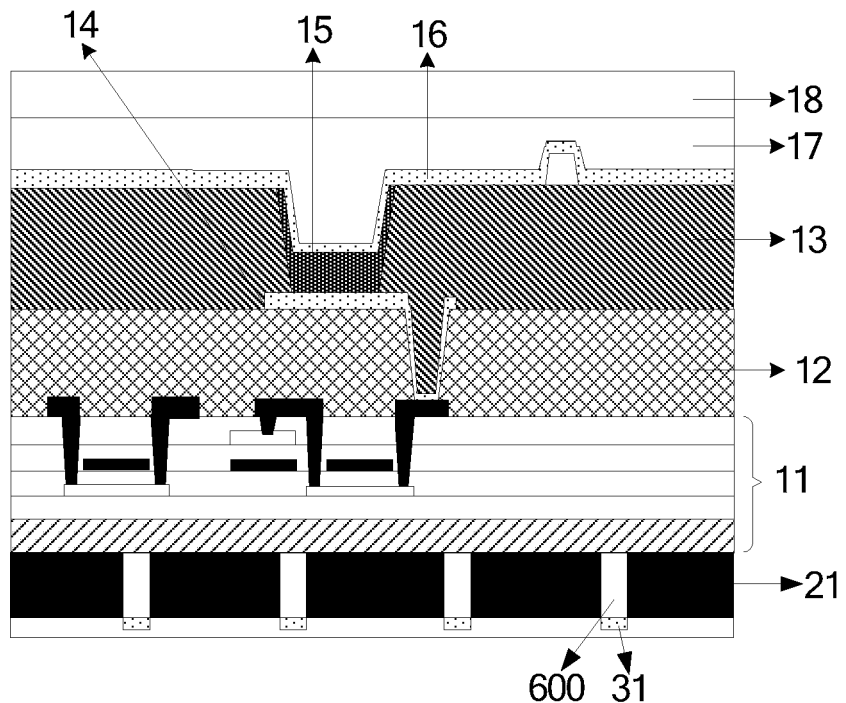
FIG. 6 is a second schematic structure diagram showing the collimating structure provided by the examples of the present disclosure.

As shown in FIG. 6, the collimating structure 2 comprises: a collimating layer 21 arranged on the back of the driving back plate 11, wherein the collimating layer 21 is made of a light-shielding material or a translucent material, and the collimating layer 21 is provided with a plurality of through-holes 600 thereon.

Illustratively, as shown in FIG. 6, the photosensitive sensors 3 may be integrated on the back face of the driving back plate of the OLED, and the sensing electrode 31 of the photosensitive sensor 3 may be arranged at the opening of the through-holes 600.

Further, the working principle of the collimating structure 2 as shown in FIG. 6 is described below.

Figure 7:
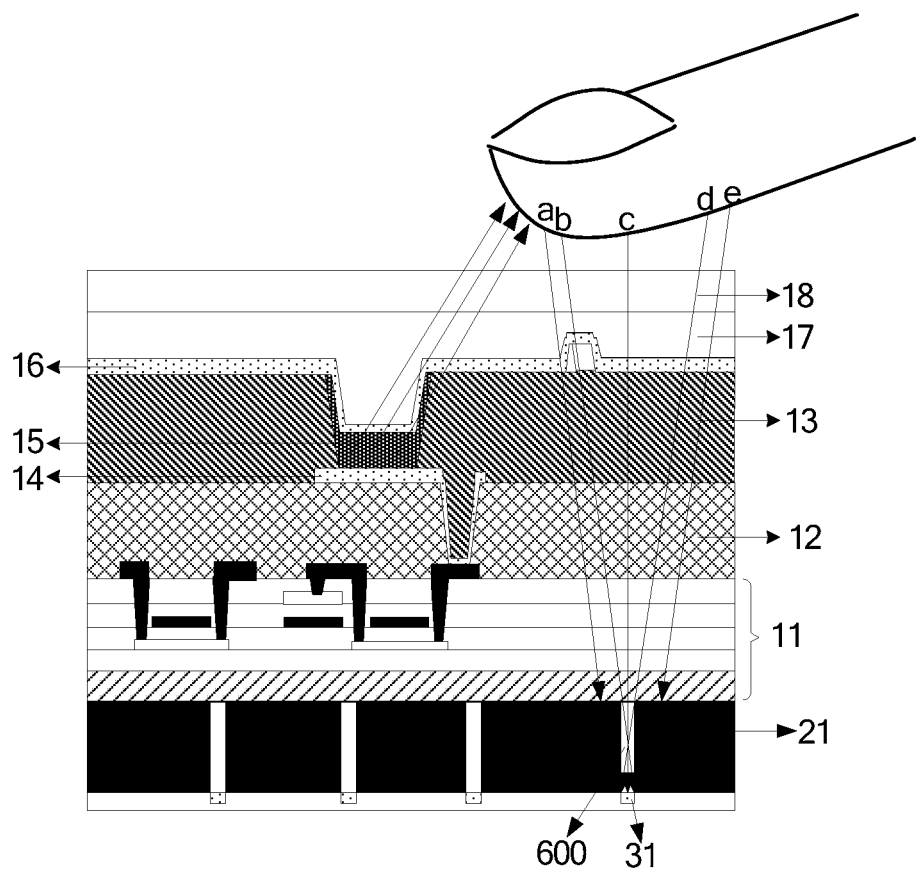
FIG. 7 is a diagram showing the working principle of the collimating structure as shown in FIG. 6 provided by the examples of the present disclosure.

As shown in FIG. 7, the detecting lights emitted from the light emitting layer 15 of the OLED transmit in sequence through the cathode electrode 16, the encapsulation layer 17 and the cover layer 18 to reach the finger, and the finger reflects the detecting lights, and the detecting lights reflected by the finger transmit in sequence through the cover layer 18, the encapsulation layer 17, the cathode electrode 16, the insulation layer 13, the isolation layer 12 and the driving back plate 11 to reach the collimating layer 21; since the collimating layer 21 is made of a light-shielding material or a translucent material, and light "a" and light "e" are transmitted onto the collimating layer 21, the light "a" and light "e" are blocked by the isolation layer and cannot reach the photosensitive electrode 31; light "b", light "c" and light "d" transmit through the collimating layer 21 via the through-holes 600 to be projected onto the photosensitive electrode 31; that is, the detecting lights received by the photosensitive electrode 31 include lights reflected by an area between light "b" and light "d" and having a scattering angle between light "b" and light "d". Since the lights that can be received by the photosensitive electrode 31 are defined within said range, it can be ensured that the photosensitive electrode 31 only receives one piece of line information, and thus solving the problem of confusing lines. The plurality of through-holes 600 cause each photosensitive electrode 31 to receive only one piece of line information, and finally, fingerprint information of the finger is obtained by the plurality of photosensitive sensors.

Likewise, the aperture of each of the through-holes 600 shall be sufficiently small and a ratio between the aperture and the depth of each of the through-holes 600 shall be sufficiently great so as to prevent lights reflected by other lines from irradiating the photosensitive electrode 31. Thus, preferably, the aperture of each of the through-holes 600 is greater than or equal to 0.1 micron and smaller than or equal to 10 microns; a ratio between the aperture and the depth of each of the through-holes 600 is greater than or equal to 1:50 and smaller than or equal to 1:5. More preferably, the aperture of each of the through-holes 600 is greater than or equal to 0.1 micron and smaller than or equal to 2 microns; a ratio between the aperture and the depth of each of the through-holes 600 is greater than or equal to 1:10 and smaller than or equal to 1:5. In addition, the specific value of the aperture of each of the through-holes 400 can be determined according to a number of sensing electrodes 31 within a unit area. The specific value of the aperture of each of the through-holes 600 is not limited in the examples of the present disclosure.

In addition, the collimating layer 21 may be made of a Black Matrix (BM) material such as glass, plastic, metal or resin, and then a size of the aperture of each of the through-holes 600 is controlled by means of embossing so as to ensure that each of the through-holes 600 with a satisfactory size of the aperture is formed.

Embodiment III

Figure 8:
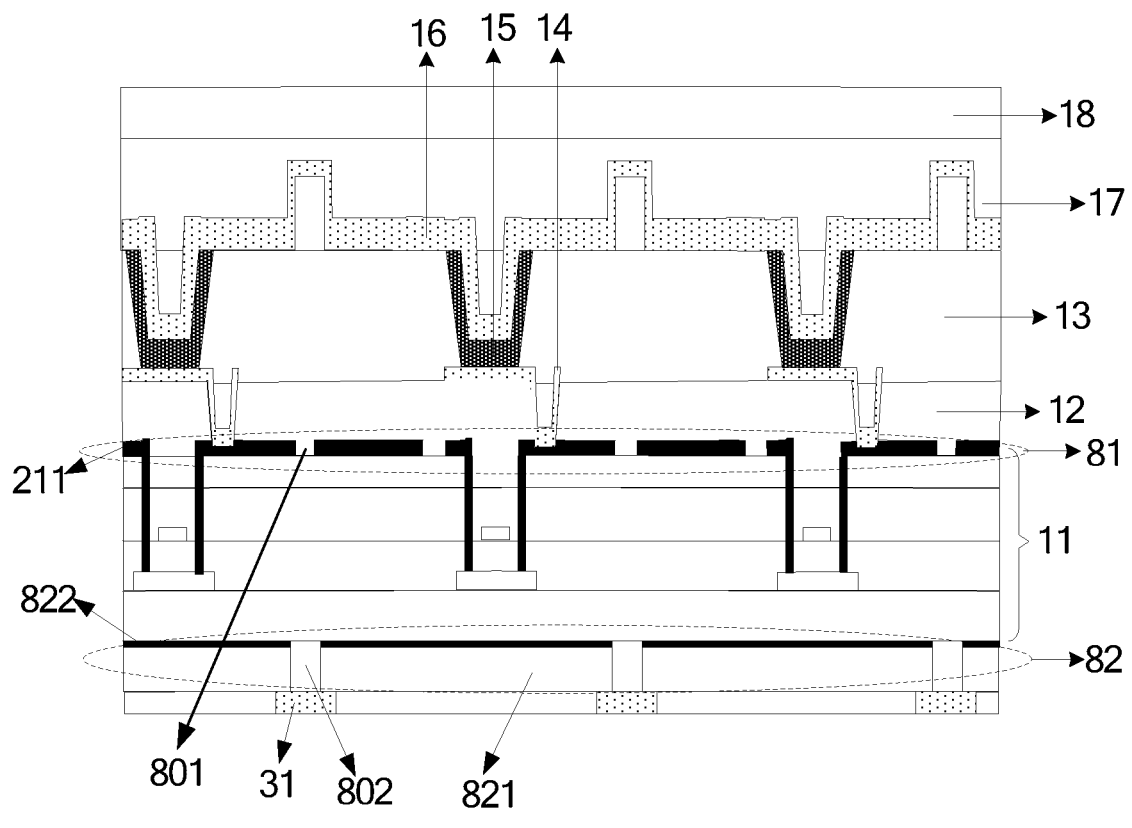
FIG. 8 is a third schematic structure diagram showing the collimating structure provided by the examples of the present disclosure.

As shown in FIG. 8, the collimating structure 2 comprises: a first collimator 81 and a second collimator 82.

The first collimator 81 comprises a plurality of first through-holes 81 arranged on a source drain metal layer 211 of the driving back plate 11.

Figure 9:
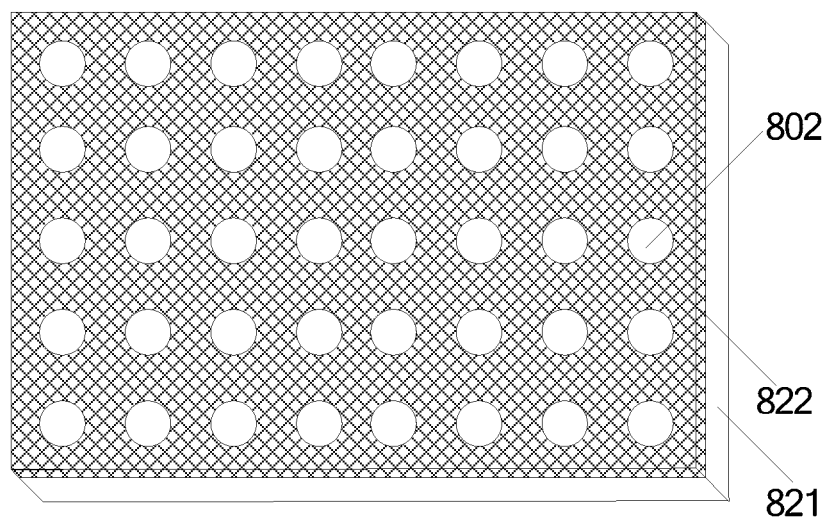
FIG. 9 is a schematic structure diagram showing a second collimator in the collimating structure as shown in FIG. 8 provided by the examples of the present disclosure.

Further, as shown in FIG. 9, the second collimator 82 comprises: a substrate 821 arranged on the back of the driving back plate 11, a light-shielding material layer 822 on a surface of the substrate 821 opposite to the driving back plate 11, and a plurality of through-holes 802 penetrating the substrate 821 and the light-shielding material layer 822, wherein the openings of the first through-holes 801 and the openings of the second through-holes 802 are in alignment with each other.

Illustratively, the substrate in the above example may be a glass substrate, a polyimide (PI) substrate, etc. In addition, the substrate in the above example may be a rigid substrate or a flexible substrate. That is, in the examples of the present disclosure, the type of the substrate is not limited.

Optionally, the light-shielding material layer 822 may be made of an opaque material. Optionally, said light-shielding material layer 822 may be made of an opaque and light-absorbing material. The light-shielding material layer 822 made of the opaque and light-absorbing material can not only prevent transmission of lights but also absorb the received lights, thereby preventing the light-shielding material layer 822 from reflecting lights and further preventing interfering lights from being generated, thereby enhancing accuracy of the recognized fingerprint information.

Illustratively, as shown in FIG. 8, the sensing electrode 31 of the photosensitive sensor 3 may be provided at the opening of one of the second through-holes 802.

The working principle of the collimating structure 2 as shown in FIG. 8 is described below.

Figure 10:
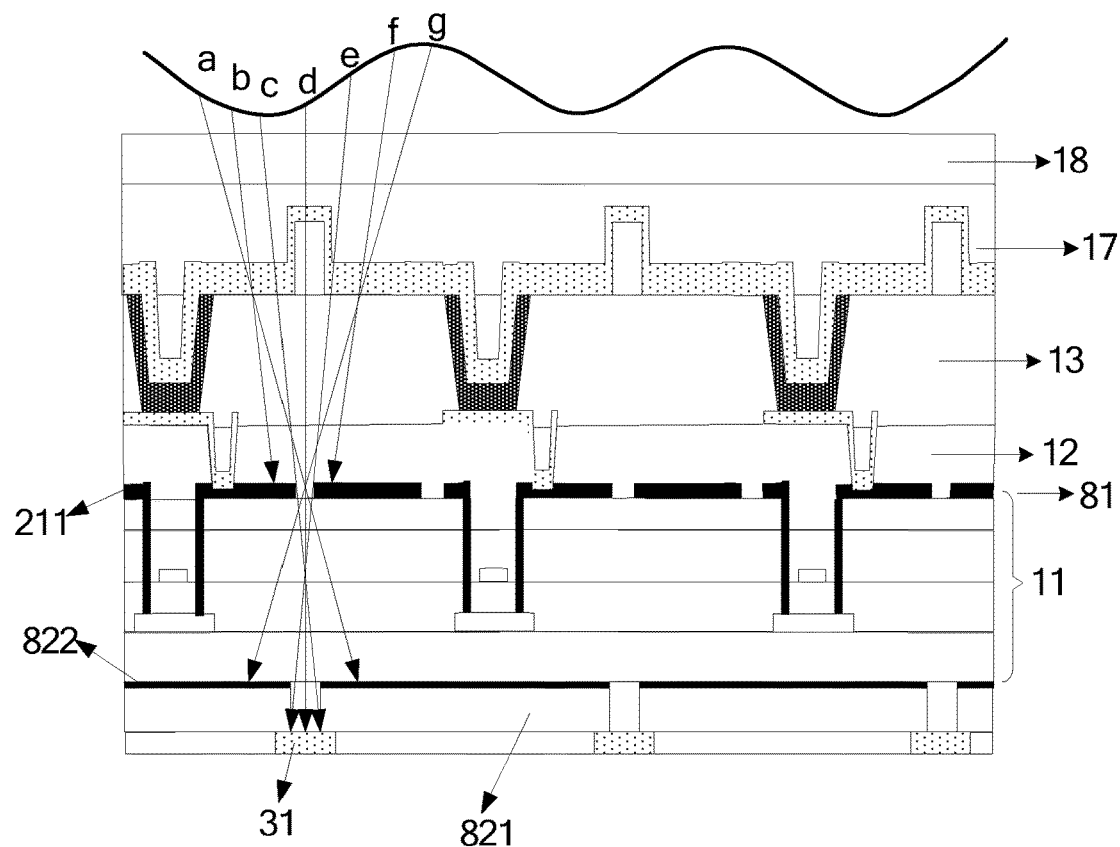
FIG. 10 is a diagram showing the working principle of the collimating structure as shown in FIG. 8 provided by the examples of the present disclosure.

As shown in FIG. 10, the detecting lights emitted from the light emitting layer 15 of the OLED transmit in sequence through the cathode electrode 16, the encapsulation layer 17 and the cover layer 18 to reach the finger, and the finger reflects the detecting lights, and the detecting lights reflected by the finger transmit in sequence through the cover layer 18, the encapsulation layer 17, the cathode electrode 16, the insulation layer 13 and the isolation layer 12; when the detecting lights reflected by the finger reach the driving back plate 11, light "b" and light "f" are projected onto the source drain metal layer 211 of the driving back late, so light "b" and light "f" are blacked; light "a", light "c", light "d", light "e" and light "g" are projected onto the second collimator 82 through the first through-holes 801 on the source drain metal layer 211; light "a" and light "g" are projected onto the light-shielding material layer 822 of the second collimator 82, so light "a" and light "g" are blocked; light "c", light "d" and light "e" are projected onto the photosensitive electrode 31 through the second through-holes 802; that is, the detecting lights received by the photosensitive electrode 31 include lights reflected by an area between light "c" and light "e" and having a scattering angle between light "c" and light "e". Since the lights that can be received by the photosensitive electrode 31 are defined within said range, it can be ensured that the photosensitive electrode 31 only receives one piece of line information, and thus solving the problem of confusing lines. The first collimator 81 and the second collimator 82 cause each photosensitive electrode 31 to receive only one piece of line information, and finally, fingerprint information of the finger is obtained by the plurality of photosensitive sensors 3.

Likewise, the aperture of each of the second through-holes 800 shall be sufficiently small to prevent lights reflected by other lines from irradiating the photosensitive electrode 31. Therefore, preferably, the aperture of each of the second through-holes 802 is greater than or equal to 0.1 micron and smaller than or equal to 2 microns.

Optionally, in said example, the first through-holes 801 and the second through-holes 802 may be round through-holes, or the first through-holes 801 and the second through-holes 802 may be square through-holes. Of course, similar solutions occurred to those skilled in the art on the basis of said example, for example, each of the first through-holes 801 is a round through-hole, and each of the second through-holes 802 is a square through-hole, or the first through-holes 801 and the second through-holes 802 are configured to be hexagonal through-holes, belong to reasonably variable solutions for the examples of the present disclosure and shall fall into the scope of protection of the present disclosure.

Embodiment IV

Figure 11:
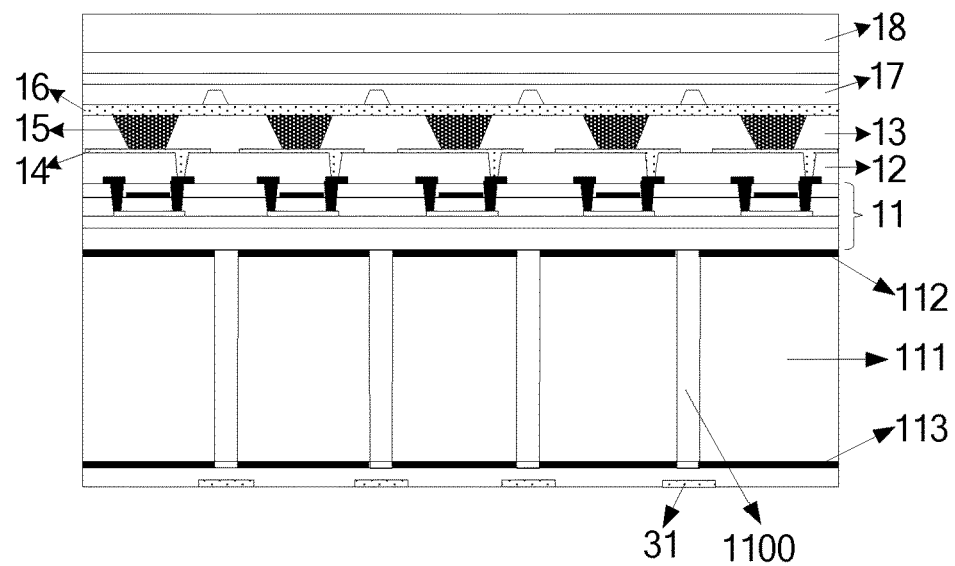
FIG. 11 is a fourth schematic structure diagram showing the collimating structure provided by the examples of the present disclosure.

As shown in FIG. 11, the collimating structure 2 comprises: a substrate 111 provided on the back of the driving back plate 11, a first light-shielding material layer 112 provided on the upper surface of the substrate 111, a second light-shielding material layer 113 provided on the lower surface of the substrate 111, and through-holes 1100 penetrating the first light-shielding material layer 112, the substrate 111 and the second light-shielding material layer 113.

Illustratively, as shown in FIG. 11, the sensing electrode 31 of the photosensitive sensor 3 may be provided at the opening of one of the through-holes 1100.

The working principle of the collimating structure 2 as shown in FIG. 11 is described below.

Figure 12:
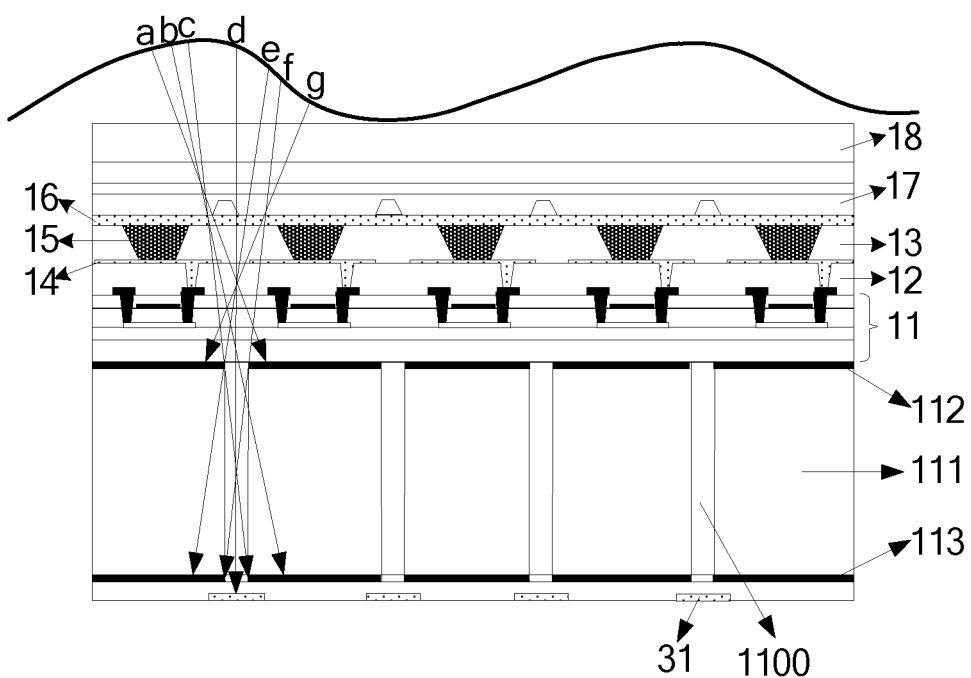
FIG. 12 is a first diagram showing the working principle of the collimating structure as shown in FIG. 11 provided by the examples of the present disclosure.

As shown in FIG. 12, detecting lights emitted from the organic light emitting layer 15 of the OLED transmit in sequence through the cathode electrode 16, the encapsulation layer 17 and the cover layer 18 to reach the finger, and the finger reflects the detecting lights; the reflected lights transmit in sequence through the cover layer 18, the encapsulation layer 17, the cathode electrode 16, the insulation layer 13, the isolation layer 12 and the driving back plate 12; when the detecting lights reflected by the finger reach the first light-shielding material layer 112, light "a" and light "g" are projected onto the first light-shielding material layer 112, so the light "a" and light "g" are blocked; light "b", light "c", light "d", light "e" and light "f" penetrate the first light-shielding material layer 112 and the substrate 111 through the through-holes 1100 to reach the second light-shielding material layer 113, and the light "b" and light "f" are projected onto the second light-shielding material layer 113, so the light "b" and light "f" are blocked; light "c", light "d" and light "e" are projected onto the photosensitive electrode 31 through the through-holes 1100, that is, the detecting lights received by the photosensitive electrode 31 are lights reflected by an area between light "c" and light "e" and having a scattering angle within light "c" and light "e". Since the lights that can be received by the photosensitive electrode 31 are defined within said range, it can be ensured that the photosensitive electrode 31 only receives one piece of line information, and thus solving the problem of confusing lines. The collimating structure 2 in said example causes each photosensitive electrode 31 to receive only one piece of line information, and finally, fingerprint information of the finger is obtained by the plurality of photosensitive sensors.

Figure 13:
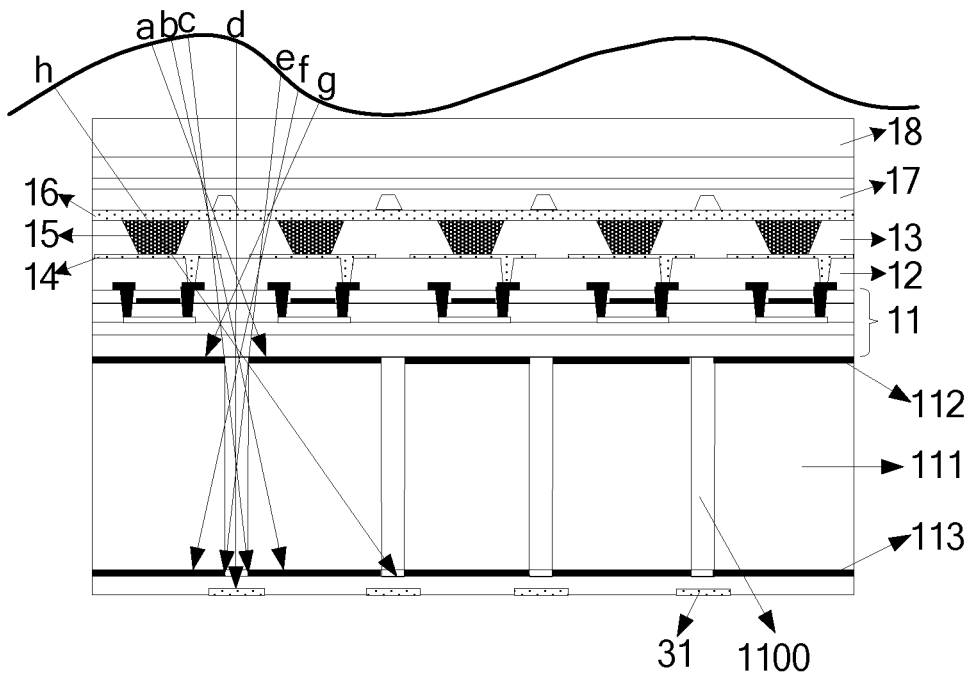
FIG. 13 is a second diagram showing the working principle of the collimating structure as shown in FIG. 11 provided by the examples of the present disclosure.
Figure 14:
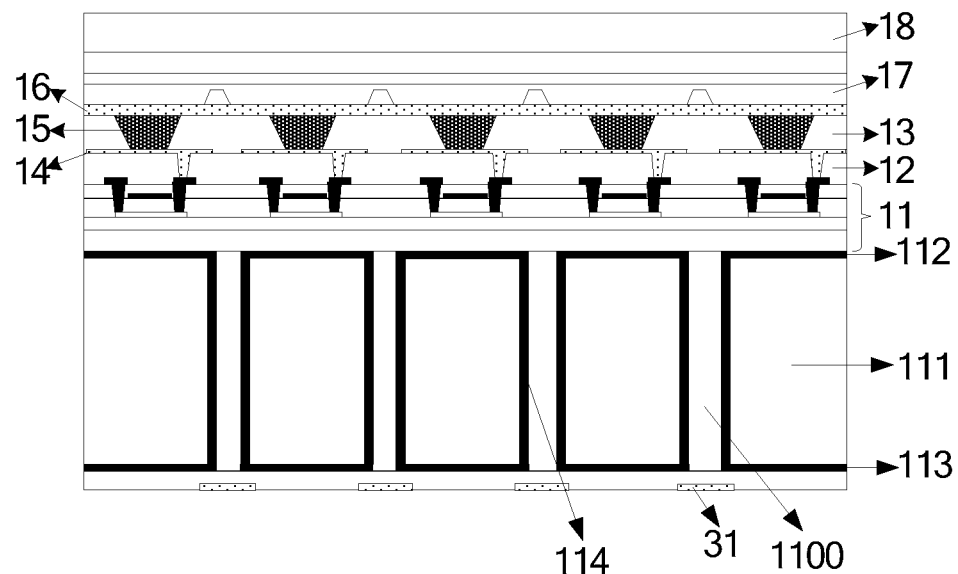
FIG. 14 is a fifth schematic structure diagram showing the collimating structure provided by the examples of the present disclosure.

Although the collimating structure provided by said example can reduce interfering lights received by the photosensitive electrode 31, there is still a part of interfering lights that can be projected onto the photosensitive electrode 31 through the through-holes 1100. For example, as shown in FIG. 13, light "h" in FIG. 13 enters through an inlet of one of the through-holes 1100 and transmits to the outlet of another one of the through-holes by the wall of the through-hole, and finally is projected onto the photosensitive electrode 31, causing interferences to the acquiring of the fingerprint information. In order to avoid said problem, the examples of the present disclosure further improve the collimating structure provided by said example. For example, as shown in FIG. 14, a light absorbing material layer 114 is further provided on the walls of the through-holes 1100.

Illustratively, the collimating structure may be manufactured by the following process: firstly, providing through-holes on the substrate, and then forming a light absorbing material on the walls of the through-holes by a hole invasion or deposition process.

Figure 15:
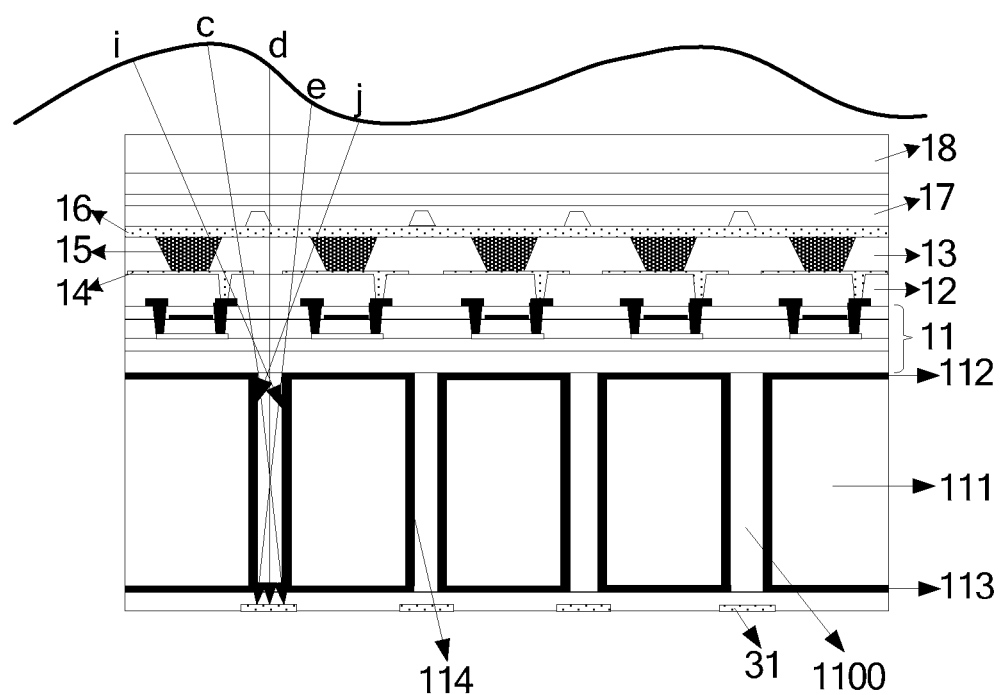
FIG. 15 is a diagram showing the working principle of the collimating structure provided as shown in FIG. 14 provided by the examples of the present disclosure.

As shown in FIG. 15, when the light absorbing material layer 114 is provided on the walls of the through-holes 1100, the photosensitive electrode 31 can only receive lights reflected by an area between light "c" and light "e" and having a scattering angle between light "c" and light "e", while other lights (for example, light "i" and light "j") are blocked or absorbed by the first light-shielding material layer 112 or the light absorbing material layer 114. Thus, the collimating structure provided by said example can further prevent interfering lights from influencing the acquiring of fingerprint information, and further can enhance accuracy of the recognized fingerprint information during the process of optical fingerprint recognition.

Embodiment V

Figure 16:
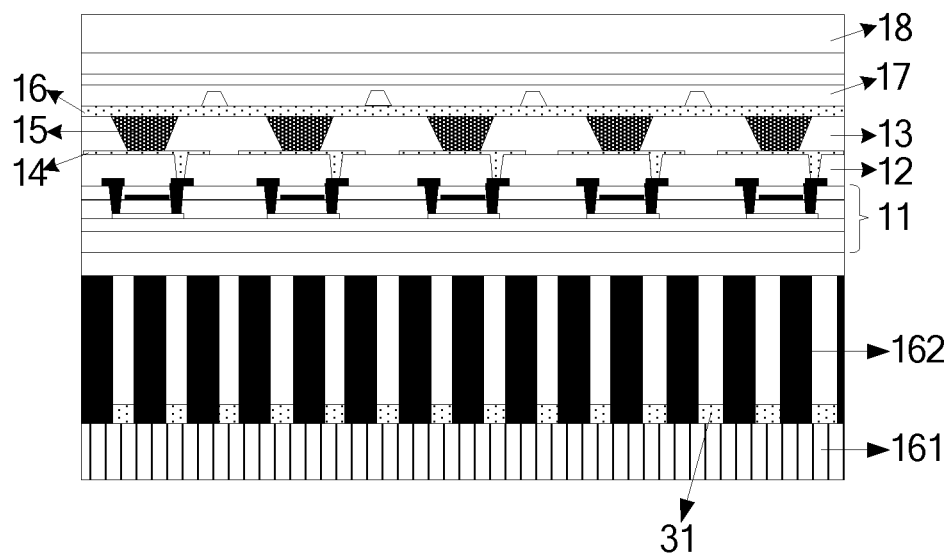
FIG. 16 is a sixth schematic structure diagram showing the collimating structure provided by the examples of the present disclosure.

As shown in FIG. 16, the collimating structure 2 comprises: a first privacy film 161 arranged on the back of the driving back plate 11, and a plurality of first privacy prisms 162 arranged between the first privacy film 161 and the driving back plate.

Illustratively, as shown in FIG. 16, the sensing electrodes 31 of the photosensitive sensors 3 are respectively arranged at the gaps among the plurality of first privacy prisms 162.

The working principle of the collimating structure 2 as shown in FIG. 16 is described below.

Figure 17:
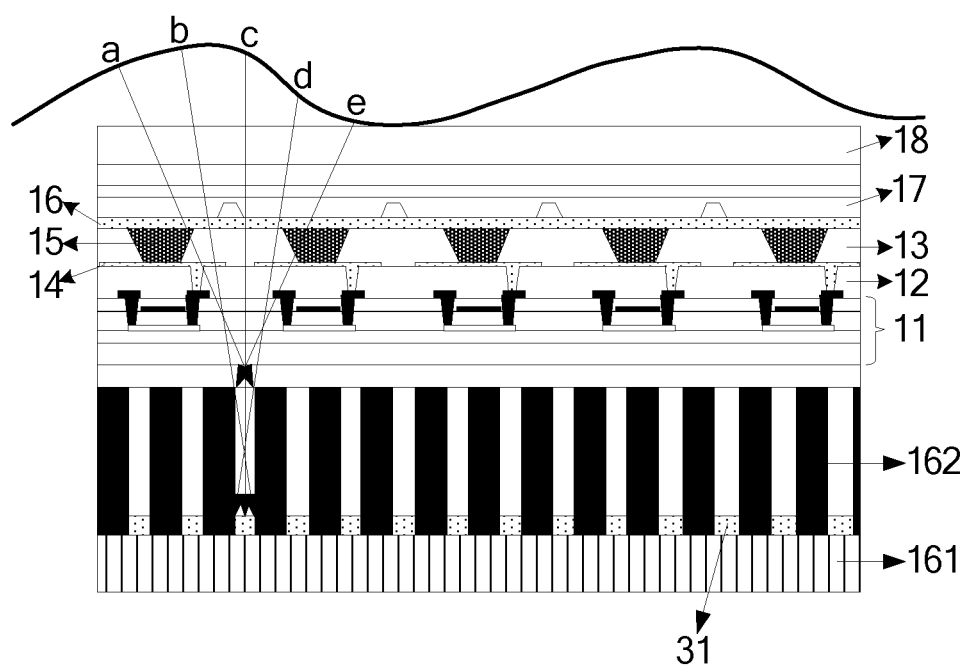
FIG. 17 is a diagram showing the working principle of the collimating structure as shown in FIG. 16 provided by the examples of the present disclosure.

As shown in FIG. 17, detecting lights emitted from the organic light emitting layer 15 of the OLED transmit in sequence through the cathode electrode 16, the encapsulation layer 17 and the cover layer 18 to reach the finger, and the finger reflects the detecting lights. The reflected lights transmit in sequence through the cover layer 18, the encapsulation layer 17, the cathode electrode 16, the insulation layer 13, the isolation layer 12 and the driving back plate 11; when the detecting lights reflected by the finger reach the first privacy prism 162, light "a" and light "e" are projected onto the first privacy prism 162, so light "a" and light "e" are blocked; light "b", light "c" and light "d" are projected onto the photosensitive electrode 31 of the photosensitive sensor 3 through the gaps among the plurality of first privacy prisms 162, that is, the detecting lights received by the photosensitive electrode 31 are lights reflected by an area between light "b" and light "d" and having a scattering angle between light "b" and light "d". Since the lights that can be received by the photosensitive electrode 31 are defined within said range, it can be ensured that the photosensitive electrode 31 only receives one piece of line information, and thus solving the problem of confusing lines. The collimating structure 2 in said example causes each photosensitive electrode 31 to receive only one piece of line information, and finally, fingerprint information of the finger is obtained by the plurality of photosensitive sensors. That is, in said example, the use of privacy prisms to form a "limit well" of the light path can also avoid the problem of light crosstalk in the optical fingerprint recognition.

Further, the collimating structure 2 provided in said example can be applied to a privacy screen. For example, as shown in FIG. 18, the collimating structure 2 further comprises a second privacy film 163 arranged on the cover layer 18 and a plurality of privacy prisms 164 arranged on the second privacy film 163.

The gaps among the plurality of first privacy prisms 162 and the gaps among the plurality of second privacy prisms 164 are in alignment with each other.

Figure 18:
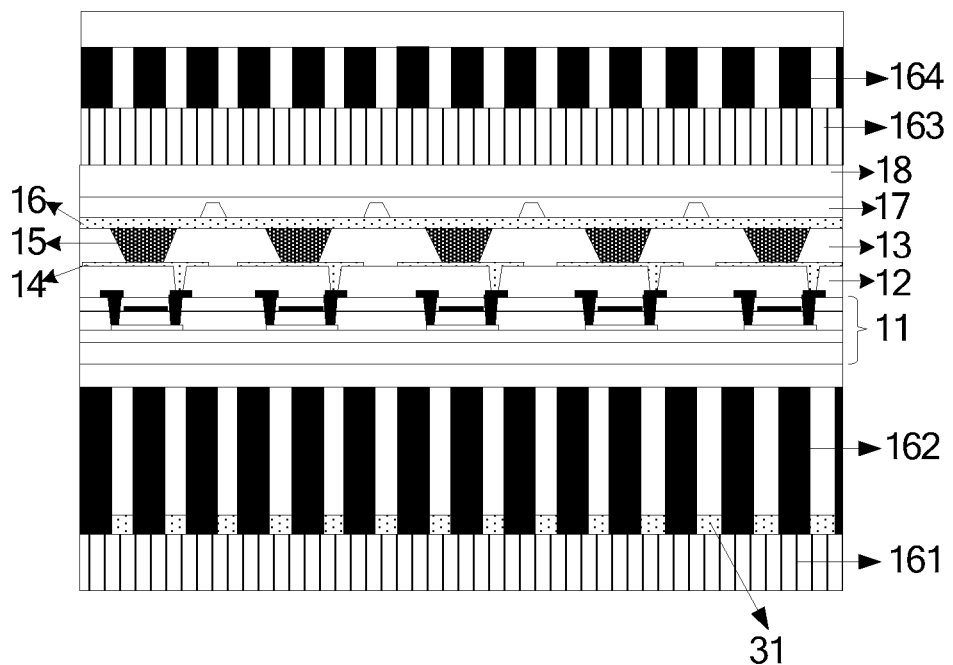
FIG. 18 is a seventh schematic structure diagram showing the collimating structure provided by the examples of the present disclosure.

The working principle of the collimating structure as shown in FIG. 18 is described below.

Figure 19:
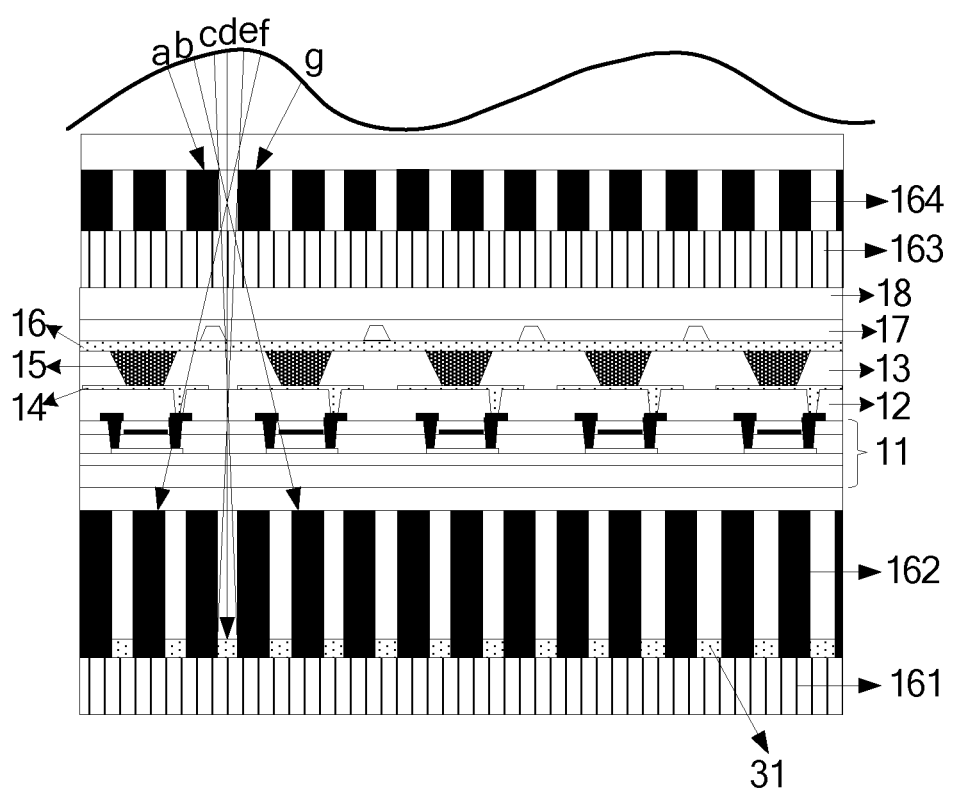
FIG. 19 is a diagram showing the working principle of the collimating structure as shown in FIG. 18 provided by the examples of the present disclosure.

As shown in FIG. 19, detecting lights emitted from the organic light emitting layer 15 of the OLED transmit in sequence through the cathode electrode 16, the encapsulation layer 17 and the cover layer 18 to reach a finger, and the finger reflects the detecting lights. Light "a" and light "g" of the reflected lights are projected onto the second privacy prism 164, so that light "a" and light "e" are blocked. Light "b", light "c", light "d", light "e" and light "f" transmit a light path "limit well" formed by the second privacy prism 164 and the second privacy film through the gaps among the plurality of second privacy prisms 164, and then the light "b", light "c", light "d", light "e" and light "f" transmit in sequence through the cover layer 18, the encapsulation layer 17, the cathode electrode 16, the insulation layer 13, the isolation layer 12 and the driving back plate 11, and at this time, light "b" and light "f" are projected onto the first privacy prism 162, so that light "b" and light "f" are blocked. Light "c", light "d" and light "e" transmit a light path "limit well" formed by the first privacy prism 162 and the first privacy film 162 through the gaps among the plurality of first privacy prisms 162 and are projected onto the photosensitive electrode 31. That is, the detecting lights received by the photosensitive electrode 31 are lights reflected by an area between light "c" and light "e" and having a scattering angle between light "c" and light "e". Since the lights that can be received by the photosensitive electrode 31 are defined within said range, it can be ensured that the photosensitive electrode 31 only receives one piece of line information, and thus solving the problem of confusing lines. The collimating structure 2 in said example causes each photosensitive electrode 31 to receive only one piece of line information, and finally, fingerprint information of the finger is obtained by the plurality of photosensitive sensors. In addition, the light path "limit well" formed by the second privacy prism 164 and the second privacy film 163 functions such that only users located within a certain angle of the OLED can receive lights emitted by the OLED. Therefore, said OLED also has a function of protecting privacy.

Embodiment VI

Figure 20:
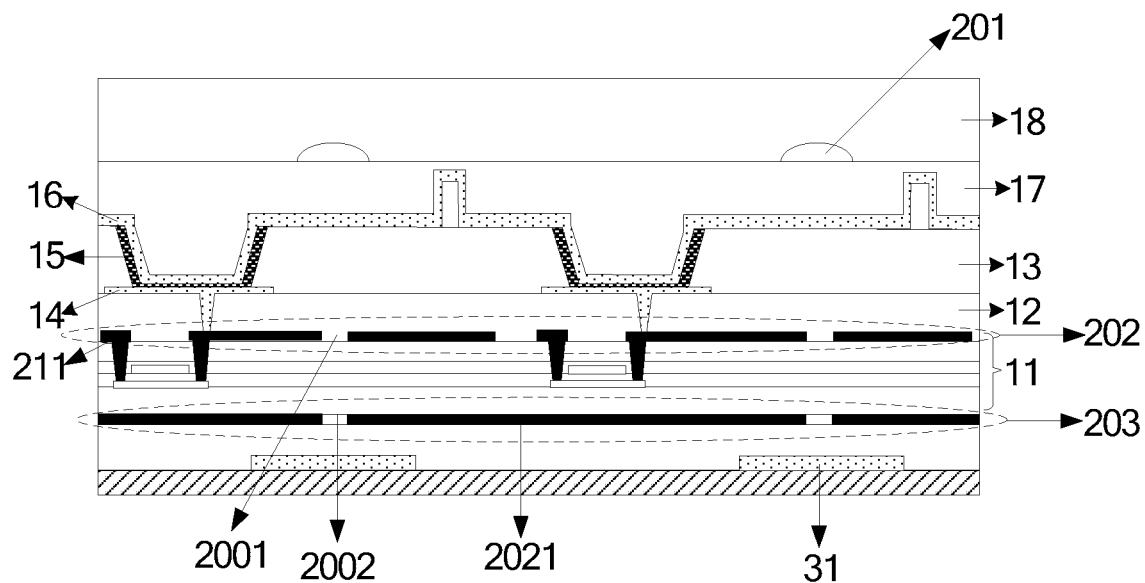
FIG. 20 is an eighth schematic structure diagram showing the collimating structure provided by the examples of the present disclosure.

As shown in FIG. 20, the collimating structure 2 comprises: a plurality of focusing lenses 201 arranged between the cover layer 18 and the encapsulation layer 17, a first collimator 202 and a second collimator 203;

the first collimator 201 comprises a plurality of through-holes 2001 arranged on the source drain metal layer 211 of the driving back plate 11; the plurality of through-holes 2001 are respectively located on a primary optical axis of one of the focusing lenses 201.

the second collimator 202 comprises a light-shielding material 2021 arranged on the back of the driving back plate 11; a plurality of openings 2002 are provided on the light-shielding material 2021; the plurality of openings 2002 are respectively located on a primary optical axis of one of the focusing lenses 201.

Optionally, each of the focusing lenses 201 has a radius greater than or equal to 6 microns; each of the openings 2002 has a diameter of 4 microns.

It is to be noted that in combination with the above embodiments, those skilled in the art would easily envisage integrating the photosensitive sensor 3 onto the driving back plate 11, and then providing a light-shielding layer with through-holes between the focusing lenses 201 and the photosensitive electrodes 31, such that the photosensitive electrode 31 can only receive lights having a scattering angle within a predetermined range, thus solving the problem of mixing of light reflected from the valleys and the ridges in the event that the finger is distant from the photosensitive electrodes 31. However, said solution has the following two problems: first, the distance between the focusing lenses 201 and the photosensitive electrodes 31 is a sum of the thicknesses of the encapsulation layer 17, the cathode electrode 16, the insulation layer 13 and the isolation layer 12, and generally, this distance is smaller than 10 μm, so the focal length of the focusing lenses 201 is smaller than 10 μm, and according to the formula of radius of curvature for a focusing lens: $r=(n1-n2)*f$, where n1 is a reflective index of the focusing lens, which is generally smaller than 1.7, n2 is a reflective index of an external interface substance of the focusing lens, which is chosen as 1.5, and by introducing the values into the formula, the radius r of curvature of the focusing lens is at most $0.2*10=2$ μm, but such a radium of curvature is very difficult to manufacture; second, the aperture of the through-holes provided on the light-shielding layer shall be very small, which shall generally be smaller than 1 μm so as to prevent light at the valleys and the ridges from penetrating the through-holes simultaneously, and it is also very difficult to manufacture the through-holes with such a size.

As shown in FIG. 20, in said example, the sensing electrode 31 of the photosensitive sensor 3 is arranged on a separate substrate, and the photosensitive electrodes 31 is in alignment with the opening 2002 arranged on the light-shielding material 2021, so that the driving back plate of the OLED exists between the focusing lenses 201 and the photosensitive electrodes 31, and the focusing lenses 201 and the photosensitive electrodes 31 are spaced apart from each other by at least a substrate, while generally, a substrate has a thickness of about 25 μm, and thus the focal length of the focusing lenses 201 can reach about 30 μm. By introducing said values into the formula of radius of curvature for a focusing lens, $r=(n1-n2)*f$, it is obtained that the radius r of curvature of the focusing lens is $0.2*30=6$ μm, and it is relatively easy to manufacture a focusing lens with such a size, and the arrangement of it between two OLED light emitting pixels would not affect normal display of the OLED.

In addition, regarding the problem that it is difficult to manufacture the collimating structure due to an excessively small aperture of the through-holes, in said example, the through-holes 2001 are firstly manufactured using the source drain metal layer 211 in the OLED driving back plate 31. A panel process generally can make the aperture of the through-holes 2001 to be about 4 μm. This layer of through-holes alone may not avoid simultaneous transmission of light from the valleys and the ridges, so in said example, a light-shielding material layer 2021 is further manufactured at the bottom of the OLED substrate, and openings 2002 are provided on the light-shielding material 2021. The two layers of through-holes 2001 and openings 2002 can realize the function of a tiny hole according to a telescope principle. Since the through-hole 2001 and the opening 2002 both have a size of about 4 μm, they are easy to manufacture, thereby solving the problem that it is difficult to manufacture the collimating structure due to an excessively small aperture of the through-holes.

On the basis of the above example, the light-shielding material layer may be integrated in the driving back plate. For example, the driving back plate 31 comprises two metal layers, which are respectively the source drain metal layer located at the top and the gate metal layer located at the bottom, and through-holes 2001 are manufactured on the source drain metal layer while openings 2002 are manufactured on the gate metal layer, which can also achieve said collimating structure.

The working principle of the collimating structure 2 as shown in FIG. 20 is described below.

Figure 21:
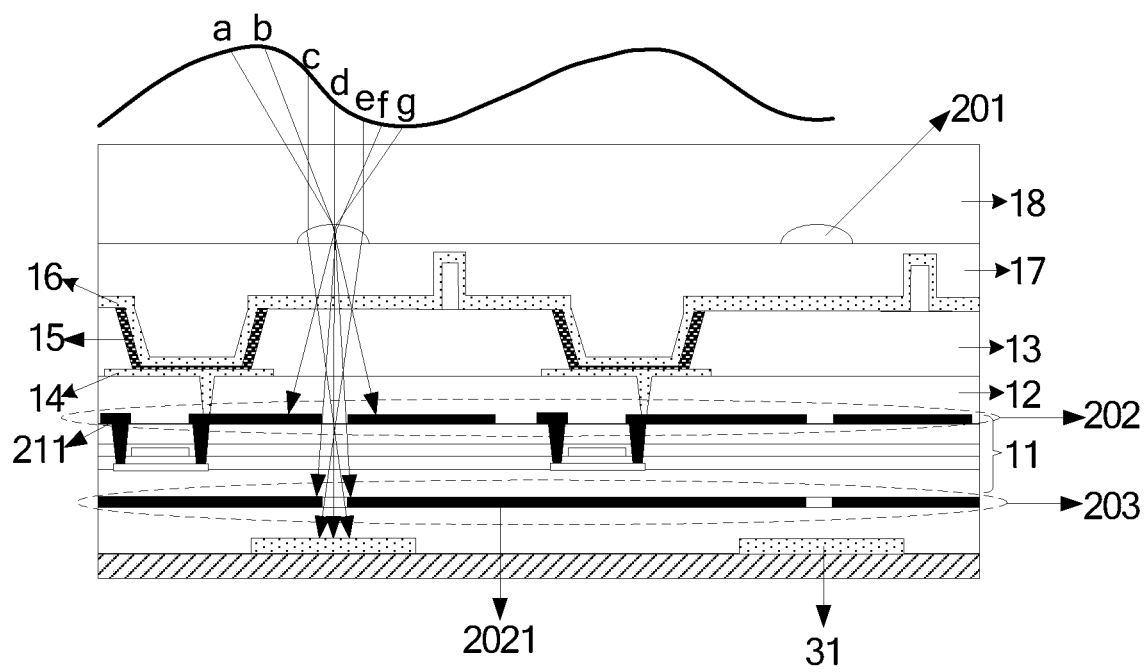
FIG. 21 is a diagram showing the working principle of the collimating structure as shown in FIG. 20 provided by the examples of the present disclosure.

As shown in FIG. 21, detecting lights emitted from the organic light emitting layer 15 of the OLED transmit in sequence through the cathode electrode 16, the encapsulation layer 17 and the cover layer 18 to reach a finger, and the finger reflects the detecting lights. The reflected lights transmit through the cover layer 18 and are projected onto the focusing lenses 201. The focusing lenses 201 focus the reflected lights, and the focused reflected lights are projected through the encapsulation layer 17, the cathode electrode 16, the insulation layer 13 and the isolation layer 12 to reach the source drain metal layer 211 of the driving back plate 11, wherein light "a" and light "g" are projected onto the source drain metal layer 211, so light "a" and light "g" are blocked; light "b", light "c", light "d", light "e" and light "f" transmit the driving back plate 21 through the through-holes 2001 on the source drain metal layer 211 to reach the second light-shielding layer, wherein light "b" and light "f" are projected onto the light-shielding material layer 2021, so that light "b" and light "f" are blocked; light "c", light "d" and light "e" transmit the light-shielding material layer 2021 through the openings 2002 on the light-shielding material layer 2021 and are projected onto the photosensitive electrode 31, that is, the detecting lights received by the photosensitive electrode 31 are lights reflected by an area between light "c" and light "e" and having a scattering angle between light "c" and light "e". since the lights that can be received by the photosensitive electrode 31 are defined within said range, it is ensured that the photosensitive electrode 31 receives only one piece of line information, and thus solving the problem of confusing lines.

An example of the present disclosure provides a display panel, comprising the optical fingerprint recognition apparatus provided by the above examples.

In addition, the display panel may be any product or component having a display function, including, for example, electronic paper, mobile phones, tablet computers, televisions, displays, notebook computers, digital photo frames, navigators and the like.

The above are only embodiments of the present disclosure, but the scope of protection of the present disclosure is not limited thereto. Any change or substitution readily occurred to those skilled in the art within the technical range revealed by the present disclosure shall be included in the scope of protection of the present disclosure. Thus, the scope of protection of the present disclosure shall be as defined by the scope of protection of the claims.

The present application claims a priority from the Chinese patent application No. 201710101011.2 filed on Feb. 23, 2017, the disclosure of which is incorporated herein in its entirety by reference as a part of the present application.

What is claimed is:

1. An optical fingerprint recognition apparatus, comprising: a light emitting structure, a collimating structure and a plurality of photosensitive sensors, wherein:
  the light emitting structure is used for generating detecting light;
  the collimating structure is used for filtering the detecting light reflected by a finger, such that light with a scattering angle in a predetermined range transmits through the collimating structure; and
  the photosensitive sensors are used for receiving the light transmitted through the collimating structure and acquiring fingerprint information according to the received light,
  wherein the light emitting structure comprises: a driving back plate, an insulation layer arranged on the driving back plate, an anode electrode layer and an isolation layer arranged on the insulation layer, an organic light emitting layer arranged on the anode electrode layer, a cathode electrode arranged on the organic light emitting layer and the isolation layer, an encapsulation layer arranged on the cathode electrode and a cover layer covering the encapsulation layer; and
  wherein the collimating structure comprises: a plurality of focusing lenses arranged between the cover layer and the encapsulation layer, a first collimator and a second collimator;
  the first collimator comprises a plurality of through-holes arranged on a source drain metal layer of the driving back plate; the plurality of through-holes are respectively located on a primary optical axis of one of the focusing lenses;
  the second collimator comprises a light-shielding material arranged on the back of the driving back plate; the light-shielding material is provided with a plurality of openings; the plurality of openings are respectively located on a primary optical axis of one of the focusing lenses.

2. The optical fingerprint recognition apparatus according to claim 1, wherein at least one of the photosensitive sensors comprises a sensing electrode, a diode and a triode;
  the sensing electrode is connected to an anode of the diode and is used for receiving the light transmitted through the collimating structure and converting the light transmitted through the collimating structure into current; and
  the a cathode electrode of the diode is connected to a first electrode of the triode; a second electrode of the triode is connected to a current detecting end, and a gate of the triode is connected to a control signal end.

3. The optical fingerprint recognition apparatus according to claim 1, wherein at least one of the isolation layer or the insulation layer is made of a light-shielding material; or at least one of the isolation layer or the insulation layer is made of a translucent material;
  the collimating structure comprises a plurality of through-holes penetrating the isolation layer and the insulation layer.

4. The optical fingerprint recognition apparatus according to claim 1, wherein the collimating structure comprises a collimating layer arranged on the back of the driving back plate; the collimating layer is made of a light-shielding material or a translucent material; and the collimating layer has a plurality of through-holes arranged thereon.

5. The optical fingerprint recognition apparatus according to claim 4, wherein an aperture of each of the through-holes is greater than or equal to 0.1 micron and smaller than or equal to 10 microns.

6. The optical fingerprint recognition apparatus according to claim 4, wherein a ratio between an aperture of each of the through-holes and a depth of each of the through-holes is greater than or equal to 1:50 and smaller than or equal to 1:5.

7. The optical fingerprint recognition apparatus according to claim 1, wherein the collimating structure comprises a first collimator and a second collimator;
  the first collimator comprises a plurality of first through-holes arranged on a source drain metal layer of the driving back plate;
  the second collimator comprises: a substrate arranged on the back of the driving back plate, a light-shielding material layer arranged on a face of the substrate opposite to the driving back plate, and a plurality of second through-holes penetrating the substrate and the light-shielding material layer; wherein openings of the first through-holes and openings of the second through-holes are in alignment with each other.

8. The optical fingerprint recognition apparatus according to claim 7, wherein the first through-holes and the second through-holes are round through-holes, or the first through-holes and the second through-holes are square through-holes.

9. The optical fingerprint recognition apparatus according to claim 7, wherein an aperture of each of the second through-holes is greater than or equal to 0.1 micron and smaller than or equal to 2 microns.

10. The optical fingerprint recognition apparatus according to claim 1, wherein the collimating structure comprises: a substrate arranged on the back of the driving back plate, a first light-shielding material layer arranged on an upper surface of the substrate, a second light-shielding material layer arranged on a lower surface of the substrate, and a through-hole penetrating the first light-shielding material layer, the substrate and the second light-shielding material layer.

11. The optical fingerprint recognition apparatus according to claim 10, wherein a light-absorbing material layer is arranged on a wall of the through-hole.

12. The optical fingerprint recognition apparatus according to claim 1, wherein the collimating structure comprises: a first privacy film arranged on the back of the driving back plate and a plurality of first privacy prisms arranged between the first privacy film and the driving back plate.

13. The optical fingerprint recognition apparatus according to claim 12, wherein the collimating structure further comprises: a second privacy film arranged on the cover layer and a plurality of second privacy prisms arranged on the second privacy film;

the gaps among the plurality of first privacy prisms and gaps among the plurality of second privacy prisms are in alignment with each other.

14. The optical fingerprint recognition apparatus according to claim 1, wherein each of the focusing lenses has a radius greater than or equal to 6 microns.

15. The optical fingerprint recognition apparatus according to claim 1, wherein each of the openings has a diameter of 4 microns.

16. A display panel, comprising an optical fingerprint recognition apparatus according to claim 1.

* * * * *